United States Patent
Naganuma et al.

(10) Patent No.: US 6,462,154 B1
(45) Date of Patent: *Oct. 8, 2002

(54) PROCESS FOR PREPARING OLEFIN POLYMER AND CATALYST FOR POLYMERIZATION OF OLEFIN

(75) Inventors: Syoji Naganuma; Masami Watanabe, both of Sodegaura (JP)

(73) Assignee: Idemitsu Kosan Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/553,544

(22) PCT Filed: Jun. 14, 1994

(86) PCT No.: PCT/JP94/00954
§ 371 (c)(1),
(2), (4) Date: Dec. 13, 1995

(87) PCT Pub. No.: WO94/29356
PCT Pub. Date: Dec. 22, 1994

(30) Foreign Application Priority Data

Jun. 15, 1993 (JP) .............................................. 5-143533

(51) Int. Cl.[7] .......................... C08F 4/602; C08F 4/642
(52) U.S. Cl. ...................... 526/153; 526/160; 526/161; 526/348.2; 526/348.6; 526/352; 502/103; 502/117; 502/152; 502/155
(58) Field of Search ................................ 502/103, 117, 502/152, 155; 526/153, 160, 161, 169, 169.1, 169.2, 348.2, 348.6, 352

(56) References Cited

U.S. PATENT DOCUMENTS

| | | | |
|---|---|---|---|
| 5,057,475 | * 10/1991 | Canich et al. | 502/104 |
| 5,096,867 | * 3/1992 | Canich | 502/103 |
| 5,132,380 | * 7/1992 | Stevens et al. | 526/126 |
| 5,272,236 | * 12/1993 | Lai et al. | 526/348.5 |
| 5,420,217 | * 5/1995 | Canich | 526/127 |
| 5,444,134 | * 8/1995 | Matsumoto | 526/159 |
| 5,453,410 | * 9/1995 | Kolthammer et al. | 502/155 |
| 5,474,962 | * 12/1995 | Takahashi et al. | 502/129 |
| 5,561,092 | * 10/1996 | Ewen et al. | 502/117 |
| 5,763,547 | * 6/1998 | Kolthammer et al. | 526/129 |

FOREIGN PATENT DOCUMENTS

| | | | |
|---|---|---|---|
| EP | 416815 | * | 3/1991 |
| EP | 0 427 697 | | 5/1991 |
| EP | 0 513 380 | | 11/1992 |
| EP | 0 554 574 | | 8/1993 |
| EP | 0 573 120 | | 12/1993 |
| EP | 0 574 258 | | 12/1993 |
| EP | 0 576 213 | | 12/1993 |
| JP | 60-250006 | | 12/1985 |
| JP | 3-188092 | | 8/1991 |
| JP | 5-505593 | | 8/1993 |
| WO | WO 92/00333 | | 1/1992 |
| WO | WO 93/13140 | | 7/1993 |
| WO | WO 93/14132 | | 7/1993 |
| WO | WO 94/03506 | * | 2/1994 |
| WO | WO 94/07927 | * | 4/1994 |

* cited by examiner

*Primary Examiner*—David W. Wu
*Assistant Examiner*—R. Rabago
(74) *Attorney, Agent, or Firm*—Oblon, Spivak, McClelland, Maier & Neustadt, P.C.

(57) ABSTRACT

There are disclosed a catalyst for the polymerization of an olefin which comprises (A) a transition metal complex compound represented by the general formula (I)

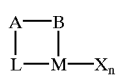

(I)

wherein the respective symbols are as defined in the specification, (B) a Lewis acid and/or an ionic compound capable of reacting with the transition metal complex compound of the component (A) or its derivative to form an ionic complex, and (C) an organic aluminum compound, and a process for preparing an olefin polymer in the presence of this catalyst. The catalyst of the present invention is inexpensive and has a high activity, and according to the present invention, the deterioration of the activity can be inhibited and the molecular weight of the obtained polymer can be easily adjusted, so that the olefin polymer can efficiently be prepared which has an optional molecular weight and can possess a molecular weight distribution in which low-molecular weight and high-molecular weight portions decrease.

8 Claims, No Drawings

PROCESS FOR PREPARING OLEFIN POLYMER AND CATALYST FOR POLYMERIZATION OF OLEFIN

TECHNICAL FIELD

The present invention relates to a process for preparing an olefin polymer and a catalyst for the polymerization of an olefin. More specifically, the present invention relates to a process for efficiently preparing a homopolymer of an olefin having heretofore unknown characteristics or a copolymer of two or more kinds of olefins by the use of a transition metal complex compound having a specific constrained geometric structure as one of catalytic components, and a catalyst for the polymerization of the olefin.

BACKGROUND ART

Heretofore, it has been known that in a process for preparing an olefin polymer, a transition metal complex compound having a specific constrained geometric structure is used as a catalytic component. For example, Japanese Patent Application Laid-open No. 163088/1991 discloses a method for preparing an olefin polymer in the presence of a catalyst system comprising the combination of a titanium series transition metal compound as a main catalytic component and methyl aluminoxane as a cocatalyst. In this method, however, a large amount of expensive methyl aluminoxane must be used in an aluminum/titanium atomic ratio of 20 to 1000 in order to obtain a sufficient catalytic activity, and so the disclosed method has a drawback that the increase in a catalyst cost is inevitable.

Furthermore, Japanese Patent Application Laid-open No. 139504/1991 discloses a method for preparing an olefin polymer in the presence of a catalyst system comprising the combination of, for example, (t-butylamido)dimethyl (tetramethyl-$\eta^5$-cyclopentaidenyl)silanetitaniumdimethyl (hereinafter referred to as "M-[alkyl] complex") and an ionic complex. This M-[alkyl] complex can usually be prepared from a halogen-substituted compound, for example, (t-butylamindo)dimethyl(tetramethyl-$\eta^5$-cyclopentaidenyl) silanetitanium dichloride, but its manufacturing process is intricate and a reaction yield is low. In consequence, a manufacturing cost increases, and for this reason, the method is not practical. In addition, the method has a disadvantage that a sufficient activity cannot be exerted.

Moreover, in World open Publication WO 94/07927 (published on Apr. 14, 1994), there has been described the improvement of the productivity of an olefin polymer by the use of a catalyst system comprising a compound having a cyclopentadienyl group and a metal in the group 4 of the periodic table, an anion of a Brønsted acid and an organic compound of an element in the group 13 of the same.

DISCLOSURE OF THE INVENTION

Under such circumstances, the present invention has been intended, and an object of the present invention is to provide a process for efficiently preparing a homopolymer of an olefin having heretofore unknown characteristics or a copolymer of two or more kinds of olefins by the use of an inexpensive and highly active catalyst containing, as one catalytic component, a transition metal complex compound having a specific constrained geometric structure. Another object of the present invention is to provide the catalyst for the polymerization of the olefin polymer.

The present inventors have intensively researched with the intention of achieving the above-mentioned objects, and as a result, it has been found that when one or more kinds of olefin monomers are polymerized in the presence of catalytic components, i.e., an organic aluminum compound and at least one selected from a transition metal complex compound having a specific structure, an ionic compound capable of reacting with the transition metal complex compound or its derivative to form an ionic complex and a Lewis acid, an olefin polymer can efficiently be obtained, and the molecular weight of this polymer can be regulated under the control of the deterioration of activity and the expansion of a molecular weight distribution of the polymer which has been impossible by conventional techniques, and this polymer can possess the molecular weight distribution having less low-molecular weight and high-molecular weight portions and can have an optional molecular weight. In consequence, the present invention has been completed on the basis of this knowledge.

That is to say, the present invention is directed to a process for preparing an olefin polymer which comprises the step of polymerizing at least one olefin monomer in the presence of (A) a transition metal complex compound represented by the general formula (I)

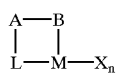

(I)

wherein M is a metallic element in the groups 3 to 10 of the periodic table or a metallic element in a lanthanoide series; L is a π-bonding ligand; A is a divalent group containing an element selected from elements in the groups 13, 14, 15 and 16 of the periodic table; B is a bonding group containing an element selected from elements in the groups 14, 15 and 16 of the periodic table, and A and B may optionally form a ring together; X is a σ-bonding ligand, a chelating ligand or a Lewis base; and n is an integer of 0 to 6 which varies with the valence of M, and when n is 2 or more, a plurality of Xs may be the same or different, (B) at least one selected from a Lewis acid and an ionic compound capable of reacting with the transition metal complex compound of the component (A) or its derivative to form an ionic complex, and (C) an organic aluminum compound as catalytic components; and a catalyst for the polymerization of an olefin which comprises the above-mentioned catalytic components (A), (B) and (C).

BEST MODE FOR CARRYING OUT THE INVENTION

In the present invention, a transition metal complex compound represented by the general formula (I)

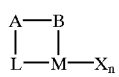

(I)

is used as a catalytic component (A).

In the general formula (I), M is a metallic element in the groups 3 to 10 of the periodic table or a metallic element in a lanthanoide series. L is a π-bonding ligand, and typical examples of this ligand include an allyl group, cyclopentadienyl groups, substituted cyclopentadienyl groups, cyclopentadienyl groups each having a hetero-atom in a cyclopentadienyl ring, and their substituted cyclopentadienyl groups. A is a divalent group containing an element selected from elements in the groups 13, 14, 15 and 16 of the periodic table, and B is a bonding group containing an element selected from elements in the groups 14, 15 and 16 of the periodic table. The above-mentioned A and B may optionally form a ring together.

Furthermore, X is a σ-bonding ligand, a chelating ligand or a Lewis base, and examples thereof include a hydrogen atom, halogen atoms, organic metalloid groups, alkoxy groups, amino groups, hydrocarbon groups, hetero-atom-containing hydrocarbon groups, amido groups and carboxyl groups.

In the present invention, as the above-mentioned X, there is preferably used HX in which a pKa value is 23 or less, particularly a value in the range of 12 to −10. If the pKa value is more than 23, a manufacturing process is intricate and so a manufacturing cost increases. Typical examples of the preferable X include halogen atoms such as a chlorine atom and a bromine atom, carboxyl groups, sulfonyl groups, thioalkoxy groups, thioaryloxy groups, acetylacetonato groups, acetylacetate groups and malonate groups of the above-mentioned examples. The halogen atom is particularly preferable because of a low manufacturing cost (with regard to the pKa value, refer to "ADVANCED ORGANIC CHEMISTRY: REACTIONS, MECHANISMS, AND STRUCTURE", Second edition, Jerry March, INTERNATIONAL STUDENT EDITION).

In the general formula, n is an integer of 0 to 6 which varies with the valence of M, and n is preferably in the range of 0 to 4, because the compound in which n is in such a range can be manufactured at a low cost. If n is 2 or more, a plurality of Xs may be the same or different.

In the present invention, preferable examples of the transition metal complex compound represented by the general formula (I) which can be used as the component (A) include (t-butylamido)dimethyl(tetramethyl-$\eta^5$-cyclopentadienyl)silanetitanium dichloride, (t-butylamido)dimethyl-(tetramethyl-$\eta^5$-cyclopentadienyl)silanetitanium dibromide, (t-benzylamido)dimethyl(tetramethyl-$\eta^5$-cyclopentadienyl)-silanetitanium difluoride, (t-butylamido)dimethyl(tetramethyl-$\eta^5$-cyclopentadienyl)silanezirconium dichloride, (t-butylamido)dimethyl(tetramethyl-$\eta^5$-cyclopentadienyl)-silanezirconium dibromide, (t-butylamido)dimethyl(tetramethyl-$\eta^5$-cyclopentadienyl)silanezirconium difluoride, (t-butylamido)dimethyl(tetramethyl-$\eta^5$-cyclopentadienyl)-silanetitanium dihydride, (t-butylamido)dimethyl(tetramethyl-$\eta^5$-cyclopentadienyl)silanetitanium chlorohydride, (t-butylamido)dimethyl(tetramethyl-$\eta^5$-cyclopentadienyl)-silanetitaniumdimethyl, (t-butylamido)dimethyl(tetramethyl-$\eta^5$-cyclopentadienyl)silanetitaniummethyl chloride, (t-butylamido)dimethyl(tetramethyl-$\eta^5$-cyclopentadienyl)silanetitaniumdiethyl, (t-butylamido)dimethyl(tetramethyl-$\eta^5$-cyclopentadienyl)silanetitanium diisopropoxide, (t-butylamido)dimethyl(tetramethyl-$\eta^5$-cyclopentadienyl)silanetitaniumdi(orthodimethylamino)benzyl, (t-butylamido)dimethyl(tetramethyl-$\eta^5$-cyclopentadienyl)silanetitanium (III) (orthodimethylamino)benzyl, (t-butylamido)dimethyl(tetramethyl-$\eta^5$-cyclopentadienyl)silanetitaniumdi(N-methyl-N-phenylamine, (t-butylamido)dimethyl(tetramethyl-$\eta^5$-cyclopentadienyl)silanetitanium (orthodimethylamino)benzyl chloride, (t-butylamido) dimethyl(tetramethyl-$\eta^5$-cyclopentadienyl)silanetitanium (III) chloride, (t-butylamido)dimethyl(tetramethyl-$\eta^5$-cyclopentadienyl)silanetantalum dichloride, (t-butylamido)dimethyl(tetramethyl-$\eta^5$-cyclopentadienyl)-silanetantalum trichloride, (t-butylamido)dimethyl(tetramethyl-$\eta^5$-cyclopentadienyl)silanevanadium chloride, (t-butylamido)dimethyl(tetramethyl-$\eta^5$-cyclopentadienyl)-silanelanthanum chloride, (t-butylamido)dimethyl(tetramethyl-$\eta^5$-cyclopentadienyl)silaneyttrium chloride, (t-butylamido)dimethyl(tetramethyl-$\eta^5$-cyclopentadienyl)-silaneneodymium chloride, (t-butylamido)(tetramethyl-$\eta^5$-cyclopentadienyl) -1,2-ethanediyltitanium dichloride, (methylamido)(tetramethyl-$\eta^5$-cyclopentadienyl)-1,2-ethanediyltitanium dichloride, (ethylamido)(tetramethyl-$\eta^5$-cyclopentadienyl)-1,2-ethanediyltitanium dichloride, (t-buylamido)(tetramethyl-$\eta^5$-cyclopentadienyl)methylenetitanium dichloride, (ethylamido)(tetramethyl-$\eta^5$-cyclopentadienyl)methylenetitanium dichloride, (benzylamido)dimethyl(tetramethyl-$\eta^5$-cyclopentadienyl) silanetitanium dichloride, (phenyl phosphide)dimethyl (tetramethyl-$\eta^5$-cyclopentadienyl)silanezirconium dichloride, (t-butylamido)dimethyl(indenyl)silanetitanium dichloride, (t-butylamido)dimethyl(1-phosphor-2,3,4,5-tetramethylcyclopentadienyl)silanetitanium dichloride, (t-butylamido)dimethyl(1-phosphor-3,4-diphenylcyclopentadienyl)-silanetitanium dichloride, (t-butylamido)dimethyl(3-phosphaindenyl)silanetitanium dichloride and (t-butylamido)dimethyl(1-bora-2,3,4,5-tetramethylcyclopentadiphenyl)silanetitanium dichloride.

Of these compounds, halogen-substituted compounds such as (t-butylamido)dimethyl(tetramethyl-$\eta^5$-cyclopentadienyl)silanetitanium dichloride, (t-butylamido) dimethyl(tetramethyl-$\eta^5$-cyclopentadienyl)silanetitanium dibromide and (t-butylamido)dimethyl(tetramethyl-$\eta^5$-cyclopentadienyl)-silanetitanium(III) chloride are preferable.

In the present invention, when such a halogen-substituted compound as mentioned above is used, this halogen-substituted compound can be alkylated with the organic aluminum compound in the catalyst system to exert a catalytic activity, as described hereinafter. Therefore, the halogen-substituted compound can directly be used in a polymerization reaction, whereby a catalyst preparation step can be simplified and the manufacturing efficiency of the polymer can also be improved. Of the halogen-substituted compounds, the chlorine-substituted compound are preferable, because they are particularly easily alkylated with the organic aluminum compound.

In the present invention, the above-mentioned transition metal complex compounds which can be used as the catalytic component (A) may be used singly or in a combination of two or more thereof.

In the present invention, as a catalytic component (B), there can be used an ionic compound (B-1) capable of reacting with the transition metal complex compound of the component (A) or its derivative to form an ionic complex, and/or a Lewis acid (B-2).

As the component (B-1), any ionic compound can be used, so far as it is capable of reacting with the transition metal complex compound of the component (A) or its derivative to form an ionic complex, but from the viewpoints of productivity and stability, compounds represented by the following general formulae (II) and (III) can suitably be used:

 (II)

 (III)

(wherein $L^2$ is $M^2$, $R^2R^3M^3$, $R^4{}_3C$ or $R^5M^3$).

[in the formulae (II) and (III), [Z]⁻ is a non-ligand anion [Z¹]⁻ or [Z²]⁻, and here [Z¹]⁻ is an anion in which a plurality of groups are bonded to an element, i.e., [M¹Y¹Y² ... Yⁿ]⁻ (wherein M¹ is an element in the groups 5 to 15 of the periodic table, preferably an element in the groups 13 to 15 of the periodic table. $Y^1$–$Y^n$ are each a hydrogen atom, a halogen atom, an organic metalloid group, an amino group, an alkoxy group, a hydrocarbon group or a hetero-atom-containing hydrocarbon group. Two or more of $Y^1$–$Y^n$ may form a ring n is an integer of [(a valence of the central metal $M^1$)+1]), and $[Z^2]^-$ is a Brønsted acid alone in which an acidity constant (pKa) is −10 or less, a conjugate base of a combination of the Brønsted acid and a Lewis acid, or a conjugate base which is usually defined as an ultra-strong acid. The group $[Z^2]^-$ may be coordinated by the Lewis base. Furthermore, $L^1$ is a Lewis base, and $R^1$ is a hydrogen atom or a hydrocarbon group, and $R^2$ and $R^3$ are each a cyclopentadienyl group or a substituted cyclopentadienyl group. The respective cyclopentadienyl groups may be the same or different, and two or more cyclopentadienyl groups may form a crosslinking structure. $R^4$ is a hydrocarbon group, a hetero-atom-including hydrocarbon group or an alkoxy group, and $R^5$ is a porphyrin, a phthalocyanine or an allyl derivative. k is an ion valence of $[L^1$–Rl] or $[L^2]$ and it is an integer of 1 to 3, and p is an integer of 1 or more, and q=(pxk). $M^2$ contains an element in the groups 1 to 3, 11 to 13 and 17 of the periodic table, and $M^3$ is an element in the groups 7 to 12 of the periodic table].

In the anion $[Z^1]^-$ in which a plurality of groups are bonded to an element, i.e., $[M^1Y^1Y^2 \ldots Y^n]^-$, typical examples of $M^1$ include B, Al, Si, P, As and Sb, and B and Al are preferable. Furthermore, typical examples of $Y^1$, $Y^2$ $\ldots Y^n$ include amino groups such as a dimethylamino group and a diethylamino group, alkoxy groups and aryloxy groups such as a methoxy group, an ethoxy group, an n-butoxy group and a phenoxy group, hydrocarbon groups such as a methyl group, an ethyl group an n-propyl group, an isopropyl group, an n-butyl group, an isobutyl group, an n-octyl group, an n-eicosyl group, a phenyl group, a p-tolyl group, a benzyl group, a 4-t-butylphenyl group and a 3,5-dimethylphenyl group, halogen atoms such as fluorine, chlorine, bromine and iodine, hetero-atom-including hydrocarbon groups such as a p-fluorophenyl group, a 3,5-difluorophenyl group, a pentachlorophenyl group, a 3,4,5-trifluorophenyl group, a pentafluorophenyl group, a 3,5-bis (trifluoromethyl)phenyl group and a bis(trimethylsilyl) methyl group, organic metalloid groups such as a pentamethylantimony group, a trimethylsilyl group, a trimethylgermil group, a diphenylarsine group, a dicyclohexylantimony group and a diphenylboron. Typical examples of the non-ligand anion, i.e., the Brønsted acid alone in which the acidity constant (pKa) is −10 or less, or the conjugate base $[Z^2]^-$ comprising the combination of the Brønsted acid and the Lewis acid include a trifluoromethanesulfonic acid anion $(CF_3SO_3)^-$, a bis(trifluoromethanesulfonyl)methyl anion, a bis(trifluoromethanesulfonyl)benzyl anion, a bis (trifluoromethanesulfonyl)-amide, a perchloric acid anion $(ClO_4)^-$, a trifluoroacetic acid anion $(CF_3CO_2)^-$, a hexafluoroantimony anion $(SbF_6)^-$, a fluorosulfonic acid anion $(FSO_3)^-$, a chlorosulfonic acid anion $(ClSO_3)^-$, a fluorosulfonic acid anion-5-antimony fluoride $(FSO_3\text{-}SbF_5)^-$, a fluorosulfonic acid anion-5-arsenic fluoride $(FSO_3\text{-}ASF_5)^-$ and a trifluoromethanesulfonic acid-5-antimony fluoride $(CF_3SO_3\text{-}SbF_5)^-$.

Moreover, typical examples of $L^1$ include ammonia, amines such as methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline and p-nitro-N,N-dimethylaniline, phosphines such as triethylphosphine, triphenylphosphine and diphenylphosphine, ethers such as dimethyl ether, diethyl ether, dioxane and tetrahydrofuran, a thioether such as tetrahydrothiophene, an ester such as ethyl benzoate, nitriles such as acetonitrile and benzonitrile, straight-chain unsaturated hydrocarbons such as ethylene, butadiene, 1-pentene, isoprene and their derivatives, and cyclic unsaturated hydrocarbons such as benzene, toluene, xylene, cyclooctadiene and cyclooctatetraene.

Typical examples of $R^1$ include hydrogen, a methyl group, an ethyl group, a benzyl group and a trityl group, and typical examples of $R^2$ and $R^3$ include a cyclopentadienyl group, a methylcyclopentadienyl group, an ethylcyclopentadienyl group and a pentamethylcyclopentadienyl group. Typical examples of $R^4$ include a phenyl group, a p-tolyl group and a p-methoxyphenyl group, and typical examples of $R^5$ include a tetraphenylporphyrin, phthalocyanine, allyl and methallyl. In addition, typical examples of $M^2$ include Li, Na, K, Ag, Cu, Br, I and $I_3$, and typical examples of $M^3$ include Mn, Fe, Co, Ni and Zn.

Typical examples of the ionic compound capable of reacting with the transition metal compound or its derivative of the above-mentioned component (A) to form an ionic complex, i.e., the (B-1) component compound include triethylammonium tetraphenylborate, tri-n-butylammonium tetraphenylborate, trimethylammonium tetraphenylborate, tetraethylammonium tetraphenylborate, methyl(tri-n-butyl)-ammonium tetraphenylborate, benzyl(tri-n-butyl) ammonium tetraphenylborate, dimethyldiphenylammonium tetraphenylborate, triphenyl(methyl)ammonium tetraphenylborate, trimethylanilinium tetraphenylborate, methylpyridinium tetraphenylborate, benzylpyridinium tetraphenylborate, methyl(2-cyanopyridinium) tetraphenylborate, triethylammonium tetrakis (pentafluorophenyl)borate, tri-n-butylammonium tetrakis-(pentafluorophenyl)borate, triphenylammonium tetrakis (pentafluorophenyl)borate, tetra-n-butylammonium tetrakis (pentafluorophenyl)borate, tetraethylammonium tetrakis (pentafluorophenyl)borate, benzyl(tri-n-butyl)ammonium tetrakis(pentafluorophenyl)borate, methyldiphenylammonium tetrakis(pentafluorophenyl)borate, triphenyl(methyl) ammonium tetrakis(pentafluorophenyl)borate, methylanilinium tetrakis(pentafluorophenyl)borate, dimethylanilinium tetrakis-(pentafluorophenyl)borate, trimethylanilinium tetrakis-(pentafluorophenyl)borate, methylpyridinium tetrakis(pentafluorophenyl)borate, benzylpyridinium tetrakis(pentafluorophenyl)borate, methyl(2-cyanopyridinium) tetrakis(pentafluorophenyl)borate, benzyl (2-cyanopyridinium) tetrakis(pentafluorophenyl)borate, methyl(4-cyanopyridinium) tetrakis(pentafluorophenyl) borate, triphenylphosphonium tetrakis(pentafluorophenyl) borate, dimethylanilinium tetrakis[bis(3,5-ditrifluoromethyl)phenyl]borate, ferrocenium tetraphenylborate, silver tetraphenylborate, trityl tetraphenylborate, tetraphenylporphyrinmanganese tetraphenylborate, ferrocenium tetrakis(pentafluorophenyl) borate, (1,1'-dimethylferrocenium) tetrakis (pentafluorophenyl)-borate, decamethylferrocenium tetrakis (pentafluorophenyl)-borate, silver tetrakis (pentafluorophenyl)borate, trityl tetrakis(pentafluorophenyl) borate, lithium tetrakis(pentafluorophenyl)borate, sodium tetrakis(pentafluorophenyl)-borate, tetraphenylporphyrin-manganese tetrakis(pentafluorophenyl)borate, silver tetrafluoroborate, silver hexafluorophosphate, silver hexafluoroarsenate, silver perchlorinate, silver trifluoroacetate and silver trifluoromethanesulfonate.

From the viewpoints of productivity and stability, preferable examples of these enumerated compounds include triethylammonium tetraphenylborate, tri-n-butylammonium tetraphenylborate, trimethylammonium tetraphenylborate, tetraethylammonium tetraphenylborate, methyl(tri-n-butyl) ammonium tetraphenylborate, benzyl(tri-n-butyl)-ammonium tetraphenylborate, dimethyldiphenylammonium tetraphenylborate, triphenyl(methyl)ammonium tetraphenylborate, trimethylanilinium tetraphenylborate, methylpyridinium tetraphenylborate, benzylpyridinium tetraphenylborate, methyl(2-cyanopyridinium) tetraphenylborate, triethylammonium tetrakis (pentafluorophenyl)borate, tri-n-butylammonium tetrakis (pentafluorophenyl)borate, triphenylammonium tetrakis (pentafluorophenyl)borate, tetra-n-butylammonium tetrakis (pentafluorophenyl)borate, tetraethylammonium tetrakis-(pentafluorophenyl)borate, benzyl(tri-n-butyl)ammonium tetrakis(pentafluorophenyl)borate, methyldiphenylammonium tetrakis(pentafluorophenyl)borate, triphenyl(methyl) ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium) tetrakis(pentafluorophenyl)borate, benzyl (2-cyanopyridinium) tetrakis(pentafluorophenyl)borate, methyl(4-cyanopyridinium) tetrakis(pentafluorophenyl) borate, triphenylphosphonium tetrakis(pentafluorophenyl) borate, dimethylanilinium tetrakis[bis(3,5-ditrifluoromethyl)phenyl]borate and trityl tetrakis (pentafluorophenyl)borate.

The ionic compounds, which are the (B-1) components, capable of reacting with the transition metal compound or its derivative of the above-mentioned component (A) to form an ionic complex may be used singly or in a combination of two or more thereof.

A use ratio of the catalytic component (A) to the catalytic component (B-1) in the present invention is suitably in the range of 20:1 to 1:20, more preferably 2:1 to 1:2 in terms of a molar ratio. The use ratio within the above-mentioned range is preferable for the sake of a low catalyst cost and a high polymerization activity.

On the other hand, no particular restriction is put on the Lewis acid which is the component (B-2), and this Lewis acid may be an organic compound or a solid inorganic compound. As the organic compound, boron compounds, aluminum compounds and the like are preferably used, and as the inorganic compound, magnesium compounds and the like are preferably used. Examples of the aluminum compounds include bis(2,6-di-t-butyl-4-methylphenoxy) aluminum methyl and (1,1-bi-2-naphthoxy)aluminum methyl, examples of the magnesium compounds include magnesium chloride and diethoxymagnesium, and examples of the boron compounds include triphenylboron, tris (pentafluorophenyl)boron, tris[3,5-bis(trifluoromethyl) phenyl]boron, tris[(4-fluoromethyl)phenyl]boron, trimethylboron, triethylboron, tri-n-butylboron, tris (fluoromethyl)boron, tris(pentafluoroethyl)boron, tris (nonafluorobutyl)boron, tris(2,4,6-trifluorophenyl)boron, tris(3,5-difluoro)boron, tris[3,5-bis(trifluoromethyl)phenyl] boron, bis(pentafluorophenyl)-fluoroboron, diphenylfluoroboron, bis(pentafluorophenyl)-chloroboron, dimethylfluoroboron, diethylfluoroboron, di-n-butylfluoroboron, pentafluorophenyldifluoroboron, phenyldifluoroboron, pentafluorophenyldichloroboron, methyldifluoroboron, ethyldifluoroboron and n-butyldifluoroboron.

These Lewis acids may be used singly or in a combination of two or more thereof.

A use ratio of the catalytic component (A) to the catalytic component (B-2) is preferably in the range of 1:0.1 to 1:2000, more preferably 1:0.2 to 1:1000, most preferably 1:0.5 to 1:200 in terms of a molar ratio, and this use ratio can suitably be selected in compliance with the kind of Lewis acid. The use ratio within the above-mentioned range is preferable for the sake of a low catalyst cost and a high polymerization activity.

The components (B-1) and (B-2) which are the catalytic components (B) may be used singly or in combination.

In the present invention, an organic aluminum compound is used as a catalytic component (C), and as this organic aluminum compound, there can usually be used a compound represented by the general formula (IV)

$$R^6_r AlQ_{3-r} \ldots \quad (IV)$$

(wherein $R^6$ is an alkyl group having 1 to 12 carbon atoms; Q is a hydrogen atom, an alkoxy group having 1 to 20 carbon atoms or a halogen atom; and r is an integer of 1 to 3).

Typical examples of the compound represented by the general formula (IV) include trimethylaluminum, triethylaluminum, tri-n-propylaluminum, triisopropylaluminum, triisobutylaluminum, tri-n-hexylaluminum, tri(2-methylpentyl)aluminum, tri-n-octylaluminum, tri-n-decylaluminum, triphenylaluminum, methyldiisobutylaluminum, dimethylaluminum chloride, diethylaluminum chloride, ethylisobutylaluminum chloride, diisobutylaluminum chloride, methylaluminum dichloride, ethylaluminum dichloride, isobutylaluminum dichloride, diethylaluminum fluoride, diisobutylaluminum hydride, diethylaluminum hydride and ethylaluminum sesquichloride.

As described below, the organic aluminum compound can exert various functions in the present invention, but in any case, in order to efficiently carry out the under-mentioned alkylation, it is preferable to use a hydrocarbon group-containing aluminum compound having at least one hydrocarbon group of 3 or more carbon atoms, preferably 3 to 10 carbon atoms. From the viewpoints of catalytic activity and molecular weight distribution adjustment, triisobutylaluminum is particularly preferable.

A use ratio of the organic aluminum of the catalytic component (C) to the catalytic component (A) is preferably 30 or more, more preferably 200 or more, most preferably in the range of 200:2500 in terms of an aluminum/transition metal element ratio.

When the use ratio is in the above-mentioned range, the polymerization activity per the transition metal can noticeably be improved. However, if the use ratio is more than the above-mentioned range, the organic aluminum compound is used in vain and remains in large quantities in the polymer unpreferably. Conversely, if it is less than the above-mentioned range, the improvement effect of the polymerization activity is low.

In the polymerization reaction of the present invention, the organic aluminum compound can exert the following functions. In the first place, the employment of the organic aluminum compound as the component (C) permits obtaining the catalyst for polymerization having a much higher catalyst function efficiency than a catalyst for polymerization comprising the catalytic components (A) and (B).

The molecular weight of the polymer can be controlled by using two or more kinds of hydrocarbon group-containing aluminum compounds having at least one hydrocarbon group of 1 or more carbon atoms as the organic aluminum compound which is the catalytic component (C). The two or more kinds of organic aluminum compounds may be used simultaneously or stepwise. By simultaneously feeding the two or more kinds of organic aluminum compounds, the molecular weight can be adjusted under the inhibition of the deterioration of the catalytic activity and the increase in the molecular weight. On the other hand, by stepwise feeding the two or more kinds of organic aluminum compounds, the polymer having the molecular weight distribution in which low-molecular weight and high-molecular weight portions are suppressed can be obtained. As such two kinds of organic aluminum compounds, a combination of triisobutylaluminum and trimethylaluminum or triethylaluminum can preferably be used. No particular restriction is put on a use ratio of the two or more kinds of organic aluminum compounds, and the polymers having various molecular weights and molecular weight distributions can be obtained by changing a mixing ratio or a use ratio of the organic aluminum compounds.

Furthermore, when at least one kind of higher olefin monomer (e.g., 1-butene, 1-hexene or 1-octene) as a comonomer is polymerized with a lower olefin monomer (e.g., ethylene or propylene) by using two or more kinds of hydrocarbon group-containing aluminum compounds having at least one hydrocarbon group of 1 or more carbon atoms in the same manner as described above, a copolymer having an extremely high comonomer content can be obtained which has not heretofore been acquired by a Ziegler-Natta catalyst. Also in this case, the content of the comonomer which is the higher α-olefin can be adjusted by changing the mixing ratio or the use ratio of the two or more kinds of organic aluminum compounds. As a typical use example, it is desirable to use triisobutylaluminum and another organic aluminum compound in a molar ratio of 1000:1 to 1:1000, preferably 100:1 to 1:100. If the mixing ratio is present in this range, a particularly excellent molecular weight adjusting function can be obtained.

In the present invention, the organic aluminum compound also functions as an alkylating agent, in the case that a halogen-substituted compound is used as the component (A). This function permits the halogen-substituted compound to be directly used as the component (A) in the polymerization reaction, by which a catalyst preparation step can be simplified. Heretofore, even if the halogen-substituted compound is directly used as the catalytic component, the catalytic activity has never or scarcely been obtained. Therefore, via a step in which a halogen in the halogen-substituted compound is replaced with another substituent, the thus treated compound has been added to the catalyst system. For example, a dichloro-substituted compound has been alkylated to be converted into a dimethyl compound, prior to its use as the catalytic component. In this case, the yield of the dimethylation has been about 56%. In view of such a conventional procedure, the effect of the present invention that the alkylation step is not required is large from the viewpoint of the simplification of the catalyst preparation step. That is to say, in the present invention, since the organic aluminum compound also functions as an alkylating agent for the halogen-substituted compound, the halogen-substituted compound is alkylated in the catalyst system to exert the catalytic activity. In consideration of such a fact, the alkyl group-containing aluminum compounds having at least one alkyl group of 3 or more carbon atoms, preferably 3 to 10 carbon atoms are preferable, and triisobutylaluminum is particularly preferable.

In the present invention, at least one of the catalytic components, when used, can be supported onto a suitable carrier. No particular restriction is put on the kind of carrier, and inorganic oxide carriers, other inorganic carriers and organic carriers can all be used. However, from the viewpoint of the easiness of morphology control and handling, the inorganic oxide carriers and the other inorganic carriers are particularly preferable.

Typical examples of the inorganic oxide carriers include $SiO_2$, $Al_2O_3$, $MgO$, $ZrO_2$, $TiO_2$, $Fe_2O_3$, $B_2O_3$, $CaO$, $ZnO$, $BaO$, $ThO_2$ and mixtures thereof, for example, silica-alumina, zeolite, ferrite, glass fiber and smectites. Above all, $SiO_2$ and $Al_2O_3$ are particularly preferable. In this connection, the above-mentioned inorganic oxide carrier may contain a small amount of a carbonate, a nitrate, a sulfate or the like.

On the other hand, examples of the carriers other than mentioned above include magnesium compounds and their complex salts represented by the general formula $MgR^7{}_x X^1{}_y$ which are typified by magnesium compounds such as $MgCl_2$ and $Mg(OC_2H_5)_2$. Here, $R^7$ is an alkyl group having 1 to 20 carbon atoms, an alkoxy group having 1 to 20 carbon atoms or an aryl group having 6 to 20 carbon atoms, $x^1$ is a halogen atom or an alkyl group having 1 to 20 carbon atoms, x is from 0 to 2, y is from 0 to 2, and x+y=2. The respective $R^7$s and $X^1$s may be the same or different.

Furthermore, examples of the organic carriers include polymers such as polystyrene, polyethylene, polypropylene, substituted polystyrenes and polyarylates, starch and carbon.

As the carriers which can be used in the present invention, $MgCl_2$, $MgCl(OC_2H_5)$, $Mg(OC_2H_5)_2$, $SiO_2$, $Al_2O_3$ and the like are preferable from the viewpoint of the easiness of morphology control and handling. The state of the carrier depends upon its kind and manufacturing process, but its average particle diameter is usually in the range of 1 to 300 $\mu$m, preferably 10 to 200 $\mu$m, more preferably 20 to 100 $\mu$m.

If the particle diameter is small, the fine power of the polymer increases, and if the particle diameter is large, the coarse particles of the polymer increase, which causes the deterioration of a bulk density and the clogging of a hopper.

Moreover, the specific surface area of the carrier is usually in the range of 1 to 1000 $m^2/g$, preferably 50 to 500 $m^2/g$, and its pore volume is usually in the range of 0.1 to 5 $cm^3/g$, preferably 0.3 to 3 $cm^3/g$.

If either of the specific surface area and the pore volume of the carrier deviates from the above-mentioned range, a catalytic activity deteriorates sometimes. In this connection, the specific surface area and the pore volume can be calculated from the volume of an adsorbed nitrogen gas in accordance with a BET method [refer to Journal of the American Chemical Society, Vol. 60, p. 309 (1983)].

Furthermore, it is desirable that the above-mentioned carrier, when used, is calcined usually at 150 to 1000° C., preferably at 200 to 800° C.

In the case that at least one of the catalytic components is supported on the above-mentioned carrier, it is desirable that at least one of the catalytic component (A) and the component (B), preferably both of the catalytic component (A) and the component (B) are supported.

No particular restriction is put on a method for supporting at least one of the component (A) and the component (B), but there can be employed, for example, (1) a method of mixing at least one of the component (A) and the component (B) with the carrier, (2) a method of mixing, in an inert solvent, at least one of the component (A) and the component (B) with the carrier, after the carrier has been treated with an organic aluminum compound or a halogen-containing silicon compound, (3) a method of reacting the carrier, the component (A) and/or the component (B) with the organic aluminum compound or the halogen-containing silicon compound, (4) a method of mixing the component (B) or the component (A) with the carrier, after the component (A) or the component (B) has been supported on the carrier, (5) a method of mixing the carrier with a catalytic reaction product of the component (A) and the component (B), and (6) a method in which the carrier is allowed to coexist in the catalytic reaction of the component (A) with the component (B).

The thus obtained catalyst may be taken out as a solid by once distilling off the solvent and then used for the polymerization, or may be used for the polymerization as it is.

Moreover, in the present invention, the catalyst can be formed by carrying out the operation of supporting at least one of the component (A) and the component (B) on the carrier in a polymerization system. For example, a process can be employed which comprises adding at lease one of the component (A) and the component (B), the carrier and, if necessary, the organic aluminum compound of the above-mentioned component (C), further adding an olefin such as ethylene under atmospheric pressure to 20 kg/cm$^2$, and then doing prepolymerization at −20 to 200° C. for a period of 1 minute to 2 hours to produce catalyst particles.

In the present invention, a use ratio of the above-mentioned compound (B) to the carrier is preferably in the range of 1:5 to 1:10000, more preferably 1:10 to 1:500 in terms of a weight ratio, and a use ratio of the compound (A) to the carrier is preferably in the range of 1:5 to 1:10000, more preferably 1:10 to 1:500 in terms of a weight ratio.

If the use ratio of the component (B) or the component (A) to the carrier deviates from the above-mentioned range, the activity deteriorates sometimes. The average particle diameter of the thus prepared catalyst for the polymerization of the present invention is usually in the range of 2 to 200 μm, preferably 10 to 150 μm, particularly preferably 20 to 100 μm, and the specific surface area of the catalyst is usually in the range of 20 to 1000 m$^2$/g, preferably 50 to 500 m$^2$/g. If the average particle diameter is less than 2 μm, the amount of the fine powder in the polymer increases sometimes, and if it is more than 200 μm, the coarse particles in the polymer increase sometimes. If the specific surface area is less than 20 m$^2$/g, the activity deteriorates sometimes, and if it is in excess of 1000 m$^2$/g, the bulk density of the polymer deteriorates sometimes. Furthermore, in the catalyst of the present invention, the amount of the transition metal in 100 g of the carrier is usually in the range of 0.05 to 10 g, particularly preferably 0.1 to 2 g. If the amount of the transition metal is outside the above-mentioned range, the activity deteriorates sometimes.

By supporting the component on the carrier as described above, there can be obtained the polymer having a high bulk density and an excellent particle diameter distribution which are industrially advantageous.

According to the preparation process of the polymer of the present invention, the employment of the above-mentioned catalyst for the polymerization results in a desirable accomplishment of the homopolymerization of an olefin, or the copolymerization of an olefin and another olefin and/or another homopolymer (i.e., copolymerization of different kinds of olefins, copolymerization of an olefin and another monomer, or copolymerization of different kinds of olefins and another monomer).

No particular restriction is put on the kind of olefin, but the α-olefins having 2 to 20 carbon atoms are preferable. Examples of such α-olefins include ethylene, propylene, 1-butene, 3-methyl-1-butene, 1-pentene, 1-hexene, 4-methyl-1-pentene, 1-octene, 1-decene, 1-dodecene, 1-tetradecene, 1-hexadecene, 1-octadecene and 1-eicosene.

Furthermore, the above-mentioned other olefin may suitably be selected from the above-mentioned olefins.

In the present invention, the above-mentioned olefins may be used singly or in a combination of two or more thereof. In the case that the copolymerization of two or more kinds of olefins is carried out, the olefins can optionally be combined. With regard to a use ratio of the olefins in such a case, for example, in the case that propylene and ethylene, or ethylene and an α-olefin having 3 to 10 carbon atoms are subjected to the copolymerization, a copolymerization ratio (a molar ratio) between propylene and ethylene, or between ethylene and the α-olefin having 3 to 10 carbon atoms is usually selected in the range of 99.9:0.1 to 0.1:99.9, preferably 99.5:0.5 to 75.0:25.0.

In the present invention, the above-mentioned olefin may be copolymerized with another monomer, and examples of the other monomer which can be used herein include vinyl aromatic compounds such as styrene, p-methylstyrene, isopropylstyrene and t-butylstyrene, straight-chain diolefins such as butadiene, isoprene and 1,5-hexadiene, cyclic olefins such as norbornene and 1,4,5,8-dimethano-1,2,3,4,4a,5,8,8a-octahydronaphthalene, cyclic diolefins such as norbornadiene, 5-ethylidenenorbornene, 5-vinylnorbornene and dicyclopentadiene, unsaturated esters such as ethyl acrylate and methyl methacrylate, lactones such as β-propiolactone, β-butyrolactone and γ-butyrolactone, lactams such as ε-caprolactam and δ-valerolactam, and epoxides such as epoxypropane and 1,2-epoxybutane.

Incidentally, the catalyst for the polymerization of the present invention can be used in not only the polymerization of the above-mentioned olefins but also the polymerization of monomers other than the olefins.

In the present invention, no particular restriction is put on a polymerization method, and there can be used any of a slurry polymerization method, a gaseous phase polymerization method, a bulk polymerization method, a solution polymerization method and a suspension polymerization method, but the slurry polymerization method and the gaseous polymerization method are particularly preferable.

With regard to polymerization conditions, polymerization temperature is usually in the range of −100 to 250° C. preferably −50 to 250° C., more preferably 0 to 220° C. Furthermore, a use ratio of the catalyst to the reactive material is such that a material monomer/the above-mentioned component (A) ratio (molar ratio) is preferably in the range of 1 to $10^8$, more preferably 1 to $10^5$. Furthermore, polymerization time is usually in the range of 5 minutes to 10 hours, and reaction pressure is usually in the range of atmospheric pressure to 200 kg/cm$^2$G, preferably atmospheric pressure to 100 kg/cm$^2$G.

Means for adjusting the molecular weight of the polymer includes the selection of kinds and amounts of catalytic components, the selection of the polymerization temperature, the decision of whether or not the polymerization is done in the presence of hydrogen, and the like.

In the polymerization, a polymerization solvent can be used, and examples of the polymerization solvent include aromatic hydrocarbons such as benzene, toluene, xylene and ethylbenzene, alicyclic hydrocarbons such as cyclopentane, cyclohexane and methylcyclohexane, aliphatic hydrocarbons such as pentane, hexane, heptane and octane, halogenated hydrocarbons such as chloroform and dichloromethane. These solvents may be used singly or in a combination of two or more thereof. Alternatively, a monomer such as the α-olefin may be used as the solvent. In a certain polymerization method, the polymerization can be carried out under non-solvent conditions.

No particular restriction is put on the molecular weight of the thus obtained polymer, but an intrinsic viscosity [η] (measured in decalin at 135° C.) of the polymer is preferably 0.1 dl/g or more, more preferably 0.2 to 20 dl/g, most preferably 0.3 to 15 dl/g.

In the present invention, preliminary polymerization can be carried out in the presence of the above-mentioned catalyst for the polymerization. The preliminary polymerization can be done by bringing, for example, a small amount of an olefin into contact with the solid catalytic component, but no particular restriction is put on its manner and a known manner can be used. The olefin for use in the preliminary polymerization is not particularly limited, and the same olefins as enumerated above are usable. Examples of such olefins include ethylene, α-olefins having 3 to 20 carbon atoms and mixtures thereof, but it is advantageous to employ the same olefin as used in the polymerization.

Furthermore, preliminary polymerization temperature is usually in the range of −20 to 200° C., preferably −10 to 130° C., more preferably 0 to 80° C. In the preliminary polymerization, as a solvent, there can be used inactive hydrocarbons, aliphatic hydrocarbons, aromatic hydrocarbons and monomers. Above all, the aliphatic hydrocarbons are particularly preferable. In this connection, the preliminary polymerization may be carried out in the absence of any solvent.

In the preliminary polymerization, it is preferable to regulate conditions so that the intrinsic viscosity [η] (measured in decalin at 135° C.) of a preliminary polymerization product may be 0.2 dl/g or more, preferably 0.5 dl/g or more and the amount of the preliminary polymerization product per mmol of the transition metal component in the catalyst may be in the range of 1 to 10000 g, preferably 10 to 1000 g.

Next, the present invention will be described in more detail with respect to examples, but the scope of the present invention should not be limited to these examples.

In the examples and comparative examples, physical properties of polymers were measured as follows.

(1) Intrinsic viscosity [η]

This was measured in decalin at 135° C.

(2) Weight-average molecular weight (Mw) and number-average molecular weight (Mn)

Each of them was determined in terms of polyethylene by gel permeation chromatography (GPC) (device: Waters ALC/GPC 150C, column: TSK HM+GMH6×2 made by Toso Co., Ltd., flow rate: 1.0 ml/min) at 135° C. by the use of 1,2,4-trichlorobenzene as a solvent.

(3) Melting point

This was measured by DSC (differential scanning calorimeter) analysis.

Measurement conditions

First heating: From room temperature to 190° C., at 10° C./min, and maintained for 3 min First cooling: From 190° C. to room temperature, at 10° C./min, a nd maintained for 3 min Second heating: From room temperature to 190° C., at 10° C./min (4) octene unit content (mol%)

This was measured by $^1$H-NMR.

EXAMPLE 1

(1) Synthesis of dimethylanilinium tetrakis (pentafluorophenyl)borate

Pentafluorophenyllithium prepared from 152 mmol of bromopentafluorobenzene and 152 mmol of butyllithium was reacted with 45 mmol of boron trichloride in hexane to obtain white solid tris (pentafluorophenyl )boron.

41 mmol of the thus obtained tris(pentafluorophenyl) boron was reacted with 41 mmol of pentafluorophenyllithium, and white solid lithiumtetrakis (pentafluorophenyl)boron was then isolated.

Next, 16 mmol of lithiumtetrakis(pentafluorophenyl) boron was reacted with 16 mmol of dimethylaniline hydrochloride in water, thereby obtaining 11.4 mmol of white solid dimethylanilinium tetrakis(pentafluorophenyl)borate ([PhMe$_2$NH][B(C$_6$F$_5$)$_4$]). It was confirmed by $^1$H-NMR and $^{13}$C-NMR that the obtained product was the desired product.

(2) Polymerization of ethylene

In a 1.4-liter autoclave purged with dried nitrogen were placed 400 ml of toluene, 2.0 mmol of triisobutylaluminum (TIBA) [(C$_4$H$_9$)$_3$Al], 1 micromol of ( t-butylamido)-dimethyl(tetramethyl-η$^5$-cyclopentadienyl)silanetitanium dichloride [{C$_5$(Me)$_4$}SiMe$_2$N(t-Bu)TiCl$_2$] and 1 micromol of dimethylanilinium tetrakis(pentafluorophenyl)borate obtained in the above-mentioned (1). Next, ethylene was continuously fed to the autoclave at 80° C. so that the pressure in the system might be 4 kg/cm$^2$G, followed by polymerization for 1 hour, to obtain 9.47 g of polyethylene. Mw and Mw/Mn of the obtained polymer were 118,000 and 1.9, respectively. The results of the polymerization are shown in Table 1.

Comparative Example 1

In a 1.4-liter autoclave which had been purged with dried nitrogen were placed 400 ml of toluene, 1 micromol of (t-butylamido)dimethyl(tetramethyl-η$^5$-cyclopentadienyl)-silanetitanium dichloride [{C$_5$(Me)$_4$}SiMe$_2$N(t-Bu)TiCl$_2$] and 1 micromol of dimethylanilinium tetrakis (pentafluorophenyl)-borate obtained in the above-mentioned 1-(1). Next, ethylene was continuously fed to the autoclave at 80° C. so that the pressure in the system might be 4 kg/cm$^2$G, followed by polymerization for 1 hour, but a desired polyethylene could not be obtained. Polymerization conditions and the results of the polymerization are shown in Table 1.

EXAMPLE 2

Polymerization was carried out by the same procedure as in Example 1 except that triisobutylaluminum (TIBA) in Example 1 was replaced with triethylaluminum (TEA) [(C$_2$H$_5$)$_3$Al], thereby obtaining 0.5 g of polyethylene. Mw and Mw/Mn of the obtained polymer were 22,000 and 2.9, respectively. Polymerization conditions and the results of the polymerization are shown in Table 1.

EXAMPLE 3

Polymerization was carried out by the same procedure as in Example 1 except that triisobutylaluminum (TIBA) in Example 1 was replaced with trimethylaluminum (TMA) [(CH$_3$)$_3$Al], thereby obtaining 1.15 g of polyethylene.

Mw and Mw/Mn of the obtained polymer were 277,000 and 1.7, respectively. Polymerization conditions and the results of the polymerization are shown in Table 1.

EXAMPLE 4

Polymerization was carried out by the same procedure as in Example 1 except that 2.0 mmol of triisobutylaluminum (TIBA) in Example 1 was replaced with 2.0 mmol of TIBA and 0.2 mmol of TEA, thereby obtaining 0.66 g of polyethylene. Mw and Mw/Mn of the obtained polymer were 69,000 and 2.5, respectively. Polymerization conditions and the results of the polymerization are shown in Table 1.

TABLE 1-1

| | Ti Complex (µmol) | Ionic Complex (µmol) | Organic Aluminum Kind | Amoung (mmol) | Toluene (ml) | Ethylene (kg/cm²G) |
|---|---|---|---|---|---|---|
| Example 1 | 1 | 1 | TIBA | 2.0 | 400 | 4 |
| Comp. Ex. 1 | 1 | 1 | — | — | 400 | 4 |
| Example 2 | 1 | 1 | TEA | 2.0 | 400 | 4 |
| Example 3 | 1 | 1 | TEA | 2.0 | 400 | 4 |
| Example 4 | 1 | 1 | TIBA | 2.0 | 400 | 4 |
| | | | TEA | 0.2 | | |

TABLE 1-2

| | Polymer | | | | |
|---|---|---|---|---|---|
| | Yield (g) | Melting Point (° C.) | [η] (dl/g) | Mw | Mw/Mn |
| Example 1 | 9.47 | 134.7 | 2.37 | 118,000 | 1.9 |
| Comp. Ex. 1 | 0 | — | — | — | — |
| Example 2 | 0.5 | 131.6 | 0.34 | 22,000 | 2.9 |
| Example 3 | 1.15 | 131.2 | 4.14 | 277,000 | 1.7 |
| Example 4 | 0.66 | 133.5 | 1.03 | 69,000 | 2.5 |

Notes of Table 1

Polymerization conditions: Polymerization temperature= 80° C. and polymerization time=1 hour Ti complex: $\{C_5(Me)_4\}SiMe_2N(t\text{-}Bu)TiCl_2$ (pKa value of HX=−7)

Ionic complex: $[PhMe_2NH][B(C_6F_5)_4]$

TIBA: Triisobutylaluminum

TEA: Triethylaluminum

TMA: Trimethylaluminum

EXAMPLE 5

Copolymerization of Ethylene and 1-octene

In a 1.4-liter autoclave purged with dried nitrogen were placed 360 ml of toluene, 40 ml of 1-octene, 2.0 mmol of triisobutylaluminum (TIBA) $[(C_4H_9)_3Al]$, 1 micromol of (t-butylamido)dimethyl(tetramethyl-$\eta^5$-cyclopentadienyl)-silanetitanium dichloride $[\{C_5(Me)_4\}SiMe_2N(t\text{-}Bu)TiCl_2]$ and 1 micromol of dimethylanilinium tetrakis (pentafluorophenyl)-borate obtained in Example 1-(1).

Next, ethylene was continuously fed to the autoclave at 80° C. so that the pressure in the system might be 4 kg/cm²G, followed by polymerization for 1 hour, to obtain 46.52 g of ethylene-1-octene copolymer. Mw and Mw/Mn of the obtained polymer were 127,000 and 2.46, respectively. Polymerization conditions and the results of the polymerization are shown in Table 2.

Comparative Example 2

In a 1.4-liter autoclave purged with dried nitrogen were placed 360 ml of toluene, 40 ml of 1-octene, 1 micromol of (t-butylamido)dimethyl(tetramethyl-$\eta^5$-cyclopentadienyl) silanetitanium dichloride $[\{C_5(Me)_4\}SiMe_2N(t\text{-}Bu)TiCl_2]$ and 1 micromol of dimethylanilinium tetrakis (pentafluorophenyl)borate obtained in Example 1-(1).

Next, ethylene was continuously fed to the autoclave at 80° C. so that the pressure in the system might be 4 kg/cm²G, followed by polymerization for 1 hour, but desired ethylene-1-octene copolymer could not be obtained. Polymerization conditions and the results of the polymerization are shown in Table 2.

EXAMPLE 6

Polymerization was carried out by the same procedure as in Example 5 except that 2.0 mmol of triisobutylaluminum (TIBA) in Example 5 was replaced with 2.0 mmol of TIBA and 0.4 mmol of TEA, thereby obtaining 7.04 g of ethylene-1-octene copolymer. Mw and Mw/Mn of the obtained polymer were 46,000 and 1.80, respectively. Polymerization conditions and the results of the polymerization are shown in Table 2.

EXAMPLE 7

Polymerization was carried out by the same procedure as in Example 5 except that 2.0 mmol of triisobutylaluminum (TIBA) in Example 5 was replaced with 2.0 mmol of TIBA and 0.2 mmol of TEA, thereby obtaining 23.17 g of ethylene-1-octene copolymer. Mw and Mw/Mn of the obtained polymer were 87,400 and 1.94, respectively. Polymerization conditions and the results of the polymerization are shown in Table 2.

EXAMPLE 8

Polymerization was carried out by the same procedure as in Example 5 except that 2.0 mmol of triisobutylaluminum (TIBA) in Example 5 was replaced with 2.0 mmol of TIBA and 0.2 mmol of TMA, thereby obtaining 2.75 g of ethylene-1-octene copolymer. Mw and Mw/Mn of the obtained polymer were 40,700 and 1.88, respectively. Polymerization conditions and the results of the polymerization are shown in Table 2.

EXAMPLE 9

Polymerization was carried out by the same procedure as in Example 5 except that 2.0 mmol of triisobutylaluminum (TIBA) in Example 5 was replaced with 2.0 mmol of TIBA and 0.05 mmol of TMA, thereby obtaining 20.63 g of ethylene-1-octene copolymer. Mw and Mw/Mn of the obtained polymer were 64,200 and 1.85, respectively. Polymerization conditions and the results of the polymerization are shown in Table 2.

TABLE 2-1

|  | Ti Complex (μmol) | Ionic Complex (μmol) | Organic Aluminum Kind | Amoung (mmol) | Toluene (ml) | Ethylene (kg/cm²G) | 1-octene (ml) |
|---|---|---|---|---|---|---|---|
| Example 5 | 1 | 1 | TIBA | 2.0 | 360 | 4 | 40 |
| Comp. Ex. 2 | 1 | 1 | — | — | 360 | 4 | 40 |
| Example 6 | 1 | 1 | TIBA | 2.0 | 360 | 4 | 40 |
|  |  |  | TEA | 0.2 |  |  |  |
| Example 7 | 1 | 1 | TIBA | 2.0 | 360 | 4 | 40 |
|  |  |  | TEA | 0.2 |  |  |  |
| Example 8 | 1 | 1 | TIBA | 2.0 | 360 | 4 | 40 |
|  |  |  | TMA | 0.2 |  |  |  |
| Example 9 | 1 | 1 | TIBA | 2.0 | 360 | 4 | 40 |
|  |  |  | TMA | 0.05 |  |  |  |

TABLE 2-2

| | Polymer | | | | | |
|---|---|---|---|---|---|---|
| | Yield (g) | Melting Point (° C.) | [η] (dl/g) | Octene Unit Content (mol %) | Mw | Mw/Mn |
| Example 5 | 46.52 | 96.9*1 | 1.66 | 16.7 | 127,000 | 2.46 |
| Comp. Ex. 2 | 0 | — | — | — | — | — |
| Example 6 | 7.04 | —*2 | 0.86 | 28.7 | 46,000 | 1.80 |
| Example 7 | 23.17 | —*2 | 1.11 | 24.0 | 87,400 | 1.94 |
| Example 8 | 2.75 | —*2 | 0.80 | 30.3 | 40,700 | 1.88 |
| Example 9 | 20.63 | —*2 | 1.14 | 26.0 | 64,200 | 1.85 |

Notes of Table 2

Polymerization conditions: Polymerization temperature =80° C. and polymerization time=1 hour Ti complex: {C$_5$(Me)$_4$}SiMe$_2$NH(t-Bu)TiCl$_2$ (pKa value of HX=−7)

Ionic complex: [PhMe$_2$NH][B(C$_6$F$_5$)$_4$]

TIBA: Triisobutylaluminum

TEA: Triethylaluminum

TMA: Trimethylaluminum

*1: Broad peak

*2: The melting point was not observed under measurement conditions by a used measuring device.

EXAMPLE 10

(1) Preparation of [{C$_5$(Me)$_4$}SiMe$_2$N(t-Bu)Ti][OTf]$_2$

In 10 mml of dry toluene, 0.0737 g (solution A: 0.02 mol/liter) of (t-butylamido)dimethyl(tetramethyl-η$^5$-cyclopentadienyl)silanetitanium dichloride [{C$_5$(Me)$_4$}SiMe$_2$N(t-Bu)TiCl2] was prepared, and in the dry toluene, 0.103 g (solution B: 0.04 mol/liter) of silver trifluoromethanesulfonate [AgOTf] was prepared. Next, the solution B was slowly added dropwise to the solution A at room temperature. Afterward, the produced silver chloride (solid) was removed from the solution by filtration to obtain a 0.01 mol/liter solution of (t-butylamido)dimethyl(tetramethyl-η$^5$-cyclopentadienyl)silanetitanium ditriflate ([{C$_5$(Me)$_4$}SiMe$_2$N(t-Bu)Ti][OTf]$_2$).

(2) Copolymerization of ethylene and 1-octene

In a 1.4-liter autoclave purged with dried nitrogen were placed 360 ml of toluene, 40 ml of 1-octene, 2.0 mmol of triisobutylaluminum (TIBA) [(C$_4$H$_9$)$_3$Al], 0.2 mmol of triethylaluminum (TEA), 1 micromol of (t-butylamido)dimethyl(tetramethyl-η$^5$-cyclopentadienyl)silanetitanium ditriflate ([{C$_5$(Me)$_4$}SiMe$_2$N(t-Bu)Ti][OTf]$_2$) obtained in Example 10-(1) and 1 micromol of dimethylanilinium tetrakis(pentafluorophenyl)borate obtained in Example 1-(1).

Next, ethylene was continuously fed to the autoclave at 80° C. so that the pressure in the system might be 4 kg/cm²G, followed by polymerization for 1 hour, to obtain 31.22 g of ethylene-1-octene copolymer.

Mw and Mw/Mn of the obtained polymer were 79,000 and 2.01, respectively. Furthermore, an octene unit content was 26.5 mol%.

EXAMPLE 11

Polymerization was carried out for 1 hour by the same procedure as in Example 1 except that in an ethylene polymerization of Example 1-(2), (t-butylamido)dimethyl-(tetramethyl-η$^5$-cyclopentadienyl)silanetitanium dichloride was replaced with (t-butylamido)dimethyl(tetramethyl-η$^5$-cyclopentadienyl)silanetitaniumdimethyl, thereby obtaining 8.2 g of polyethylene.

EXAMPLE 12

In a 1.4-liter autoclave purged with dried nitrogen were placed 400 ml of styrene, and 0.2 mmol of TIBA was added thereto and the solution was then heated up to 70° C. Next, to this solution was added a toluene solution (10 ml) prepared by mixing 20 micromol of dimethylanilinium tetrakis(pentafluorophenyl)borate obtained in Example 1-(1), 0.2 mmol of TIBA and 20 micromol of (t-butylamido) dimethyl-(tetramethyl-η$^5$-cyclopentadienyl)silanetitanium dichloride, and ethylene was continuously fed to the autoclave at 70° C. so that the pressure in the system might be 8 kg/cm²G, followed by copolymerization for 2 hours. As a result, 130 g of a copolymer could be obtained. In this copolymer, [η] was 1.11 (135° C., trichlorobenzene), and glass transition points were observed at 20° C. and 103° C. (measured at a temperature rise velocity of 10° C./min by DSC). Furthermore, the composition of the copolymer comprised 50% by weight of ethylene and 50% by weight of styrene.

POSSIBILITY OF INDUSTRIAL UTILIZATION

According to the present invention, an olefin polymer can efficiently be obtained, and the molecular weight of this polymer can be regulated under the control of the deterioration of catalytic activity and the expansion of the molecular weight distribution of the polymer which has been impossible by conventional techniques, and this polymer has an optional molecular weight and can possess the molecular weight distribution in which low-molecular weight and high-molecular weight portions decrease. Furthermore, when at least one kind of higher olefin monomer as a comonomer is polymerized with a lower olefin monomer, a polymer having an extremely high comonomer content can be obtained which has not heretofore been acquired by a Ziegler-Natta catalyst. Moreover, in the case that a halogen-substituted compound is used as a catalytic component, a catalyst preparation step can be simplified. In addition, the selection and employment of triisobutylaluminum as an organic aluminum permit a polyolefin to be prepared with a high productivity.

What is claimed is:

1. A process for preparing an olefin polymer which comprises the step of polymerizing at least one olefin monomer in the presence of a catalyst system consisting essentially of (A) a transition metal complex compound having only one cyclopentadienyl group represented by the general formula (I)

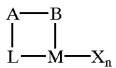
(I)

wherein M is a metallic element in group 4 of the periodic table; L is a cyclopentadienyl group or cyclopentadienyl group substituted by one or more alkyl groups; A is a divalent group containing an element selected from the group consisting of elements in the groups 13, 14, 15 and 16 of the periodic table; B is a bonding group containing an element selected from the group consisting of elements in the groups 14, 15 and 16 of the periodic table, and A and B may optionally form a ring together; X is a halogen atom; and n is an integer of 0 to 4 which varies with the valence of M, and when n is 2 or more, a plurality of Xs may be the same or different, (B) at least one member selected from the group consisting of a Lewis acid and an ionic compound capable of reacting with the transition metal complex compound of the component (A) to form an ionic complex, and (C) an aluminum compound represented by Formula IV:

$$R^6_r AlQ_{3-r}$$ (IV)

wherein $R^6$ is an alkyl group having 1 to 12 carbon atoms; Q is a hydrogen atom, an alkoxy group having 1 to 20 carbon atoms or a halogen atom; and r is an integer of 1 to 3, and wherein the aluminum compound has at least one alkyl group of 3 or more carbon atoms, the component (C) being used in an amount such that an atomic ratio of aluminum from component (C)/group IV metallic element of component (A) ranges from 200 to 2500.

2. The process for preparing an olefin polymer according to claim 1 wherein the X of the general formula (I) is a chlorine atom (C).

3. The process for preparing an olefin polymer according to claim 2, wherein M is Ti and n is 2.

4. A catalyst for the polymerization of an olefin which consists essentially of (A) a transition metal complex compound having only one cyclopentadienyl group represented by the general formula (I)

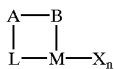
(I)

wherein M is a metallic element in the group IV of the periodic table; L is a cyclopentadienyl group or cyclopentadienyl group substituted by one or more alkyl groups; A is a divalent group containing an element selected from the group consisting of elements in the groups 13, 14, 15 and 16 of the periodic table; B is a bonding group containing an element selected from the group consisting of elements in the groups 14, 15 and 16 of the periodic table, and A and B may optionally form a ring together; X is a halogen atom; and n is an integer of 0 to 4 which varies with the valence of M, and when n is 2 or more, a plurality of Xs may be the same or different, (B) at least one member selected from the group consisting of a Lewis acid and an ionic compound capable of reacting with the transition metal complex compound of the component (A) to form an ionic complex, and (C) an aluminum compound represented by Formula IV:

$$R^6_r AlQ_{3-r}$$ (IV)

wherein $R^6$ is an alkyl group having 1 to 12 carbon atoms; Q is a hydrogen atom, an alkoxy group having 1 to 20 carbon atoms or a halogen atom; and r is an integer of 1 to 3, and wherein the aluminum compound has at least one alkyl group of 3 or more carbon atoms, or two or more different aluminum compounds represented by Formula IV:

$$R^6_r AlQ_{3-r}$$ (IV)

wherein $R^6$ is an alkyl group having 1 to 12 carbon atoms; Q is a hydrogen atom, an alkoxy group having 1 to 20 carbon atoms or a halogen atom; and r is an integer of 1 to 3, and wherein at least one of the aluminum compounds has at least one alkyl group of 3 or more carbon atoms, the component (C) being used in an amount such that an atomic ratio of aluminum from component (C)/group IV metallic element in component (A) ranges from 200 to 2500.

5. The catalyst for the polymerization of an olefin according to claim 4, wherein X is a chlorine atom and (C) is triisobutylaluminum or a combination of triisobutylaluminum and trimethylaluminum or triethylaluminum.

6. The catalyst for the polymerization of an olefin according to claim 5, wherein M is Ti and n is 2.

7. A process for preparing an olefin polymer which comprises the step of polymerizing at least one olefin monomer in the presence of a catalyst system consisting essentially of (A) a transition metal complex compound having only one cyclopentadienyl group represented by the general formula (I)

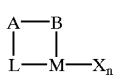
(I)

wherein M is a metallic element in group 4 of the periodic table; L is a cyclopentadienyl group or cyclopentadienyl group substituted by one or more alkyl groups; A is a divalent group containing an element selected from the group consisting of elements in the groups 13, 14, 15 and 16 of the periodic table; B is a bonding group containing an element selected from the group consisting of elements in the groups 14, 15 and 16 of the periodic table, and A and B may optionally form a ring together; X is a halogen atom;

and n is an integer of 0 to 4 which varies with the valence of M, and when n is 2 or more, a plurality of Xs may be the same or different, (B) at least one member selected from the group consisting of a Lewis acid and an ionic compound capable of reacting with the transition metal complex compound of the component (A) to form an ionic complex, and (C) two or more different aluminum compounds represented by Formula IV:

$$R^6_r AlQ_{3-r} \quad (IV)$$

wherein $R^6$ is an alkyl group having 1 to 12 carbon atoms; Q is a hydrogen atom, an alkoxy group having 1 to 20 carbon atoms or a halogen atom; and r is an integer of 1 to 3, and wherein at least one of the aluminum compounds has at least one alkyl group of 3 or more carbon atoms, the component (C) being used in an amount such that an atomic ratio of aluminum from component (C)/group IV metallic element of component (A) ranges from 200 to 2500.

8. The process for preparing an olefin polymer according to claim 7 wherein a combination of triisobutylaluminum and trimethylaluminum or triethylaluminum is used as (C).

* * * * *